May 29, 1956 R. V. ADAIR ET AL 2,748,038
METHOD AND APPARATUS FOR ROLL QUENCHING AND STRAIGHTENING
CYLINDRICAL ELONGATED WORKPIECES
Filed April 13, 1953 6 Sheets-Sheet 5
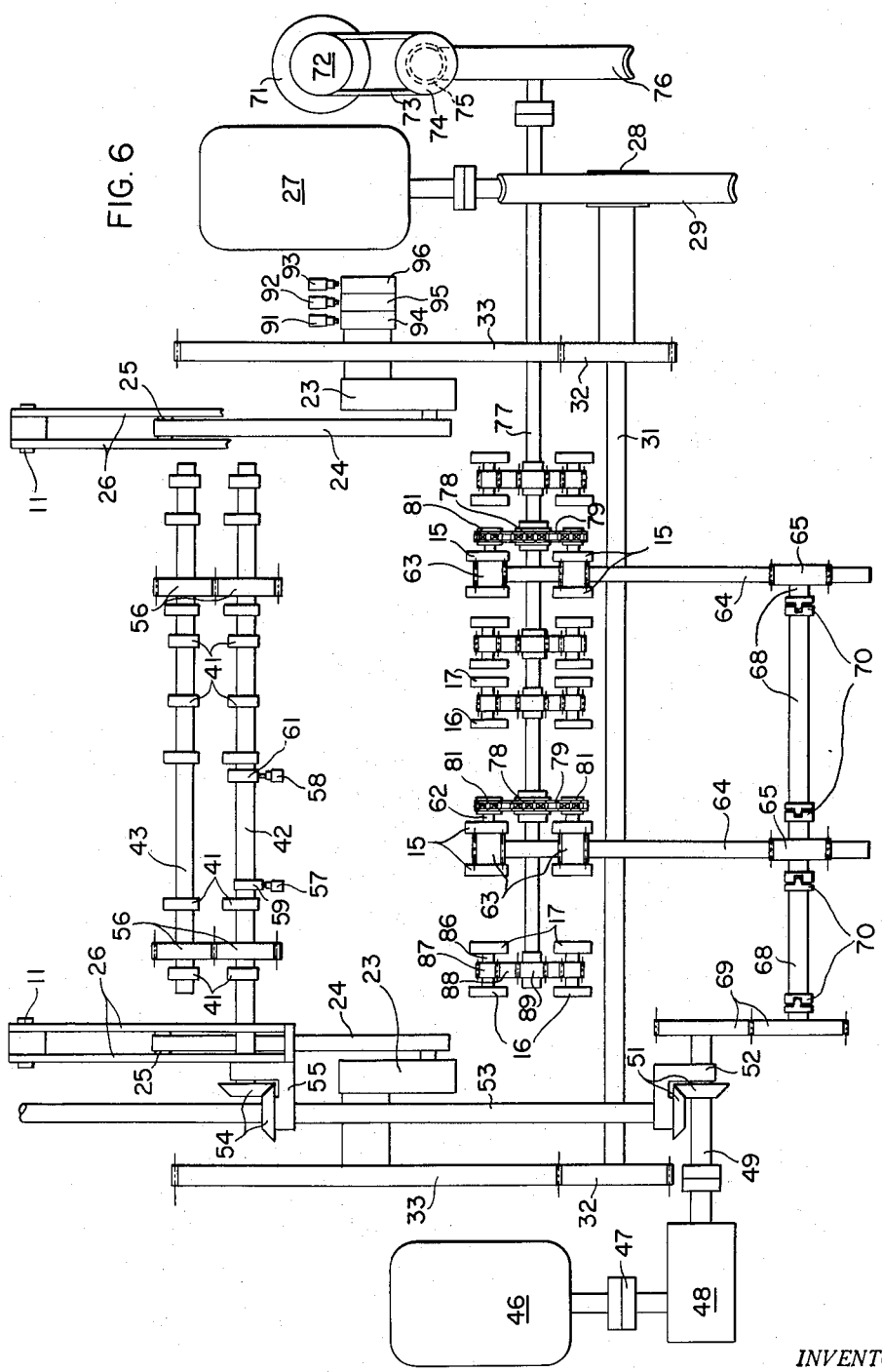
INVENTORS
ROBERT V. ADAIR
EARL D. DAMMERT
EDWARD C. VAN BEERS
BY Richard W. Treverton
ATTORNEY

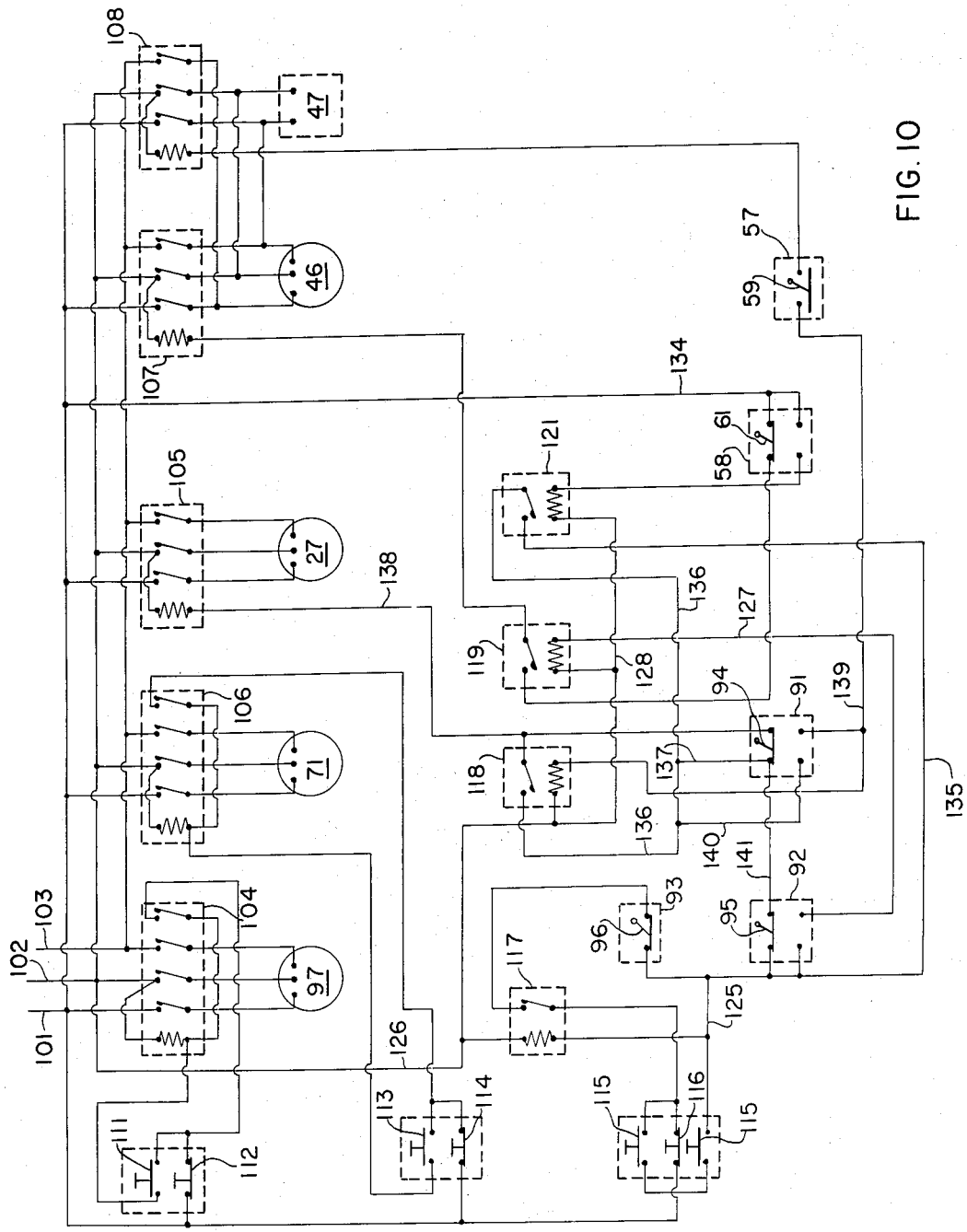

United States Patent Office 2,748,038
Patented May 29, 1956

2,748,038

METHOD AND APPARATUS FOR ROLL QUENCHING AND STRAIGHTENING CYLINDRICAL ELONGATED WORKPIECES

Robert V. Adair, Rochester, Earl D. Dammert, Penfield, and Edward C. Van Beers, Brighton, N. Y., assignors to The Gleason Works, Rochester, N. Y., a corporation of New York Application April 13, 1953, Serial No. 348,512

14 Claims. (Cl. 148—12.4)

The present invention relates to a rolling quench and straightening machine and method, for metal workpieces of elongated substantially cylindrical form such as steel axles, shafts, camshafts and the like.

According to the method a heated workpiece that is to be quenched as part of a hardening process is rotated between two sets of rollers which hold it substantially straight while a quenching medium is applied to it. Then, after the quench has been nearly completed, the axis of the workpiece is bowed by changing the alignment of rollers of the two sets, and the workpiece is then rotated about this bowed axis. Finally, while the workpiece is still being rotated, it is returned to its substantially straight condition by restoring the original alignment of the rollers. It has been found that by this method straighter workpieces are produced than when the workpieces are rolled while being held perfectly straight by the rollers. The method is especially advantageous when the workpieces are of such shape as to be susceptible to a large amount of distortion during heat treatment, as for example in the case of tubular shafts having transverse holes therethrough at various points along their length.

The machine employed to carry out the above-described method has a quenching chamber and two sets of rollers for supporting a workpiece in the chamber while the quenching medium is there applied to it, means for moving one set of rollers toward and away from the other set respectively to and from an operative relationship wherein rollers of both sets engage the workpiece, and means for rotating the workpiece upon the rollers while in such operative relationship. According to the present invention the machine is characterized by the provision of a means to change the alignment of rollers of both sets.

Preferably the machine has a frame carrying one of the sets of rollers, a pressure head carrying the other set and pivoted to the frame for motion about a horizontal axis, and a means, comprising a crank journaled in the frame and a rod pivotally connecting the crank and the pressure head, to move said other set of rollers toward and away from the set carried by the frame.

The means to change the alignment of both sets of rollers comprises a mechanism to shift at least one roller of each set in a direction generally radial of the workpiece. The mechanism for thus shifting a roller of the frame-carried set may include a rotatable element supporting the roller on an axis eccentric of its own axis, and means to rotate the element through an angle of one-half turn. This means preferably comprises a pinion connected to the rotatable element, a rack for driving the pinion, means to limit the stroke of the rack so as to rotate the element through only one-half turn, and reversible power means to operate the rack.

The mechanism to shift a roller of the other set, preferably a roller carried by the pressure head, may comprise a roller support, a rotatable cam for moving the roller, and means for rotating the cam through a predetermined angle. There is preferably a means to operate simultaneously the roller-shifting mechanisms of the two sets, and this means may comprise gearing for connecting them that is so arranged as to maintain their connection during the movement of one set of rollers to and from operative relationship with the other set.

The means for rotating a workpiece held between the two sets of rollers may include a drive for at least one of the rollers that is shifted. Such drive is preferably arranged to function in any position to which the roller is shifted, and to this end may comprise drive and driven sprockets, an endless chain running over these sprockets, and a spring-biased idler also engaging the chain.

The foregoing and other objects and advantages of the invention will appear from the following detailed description made with reference to the drawings, wherein.

Figure 2:
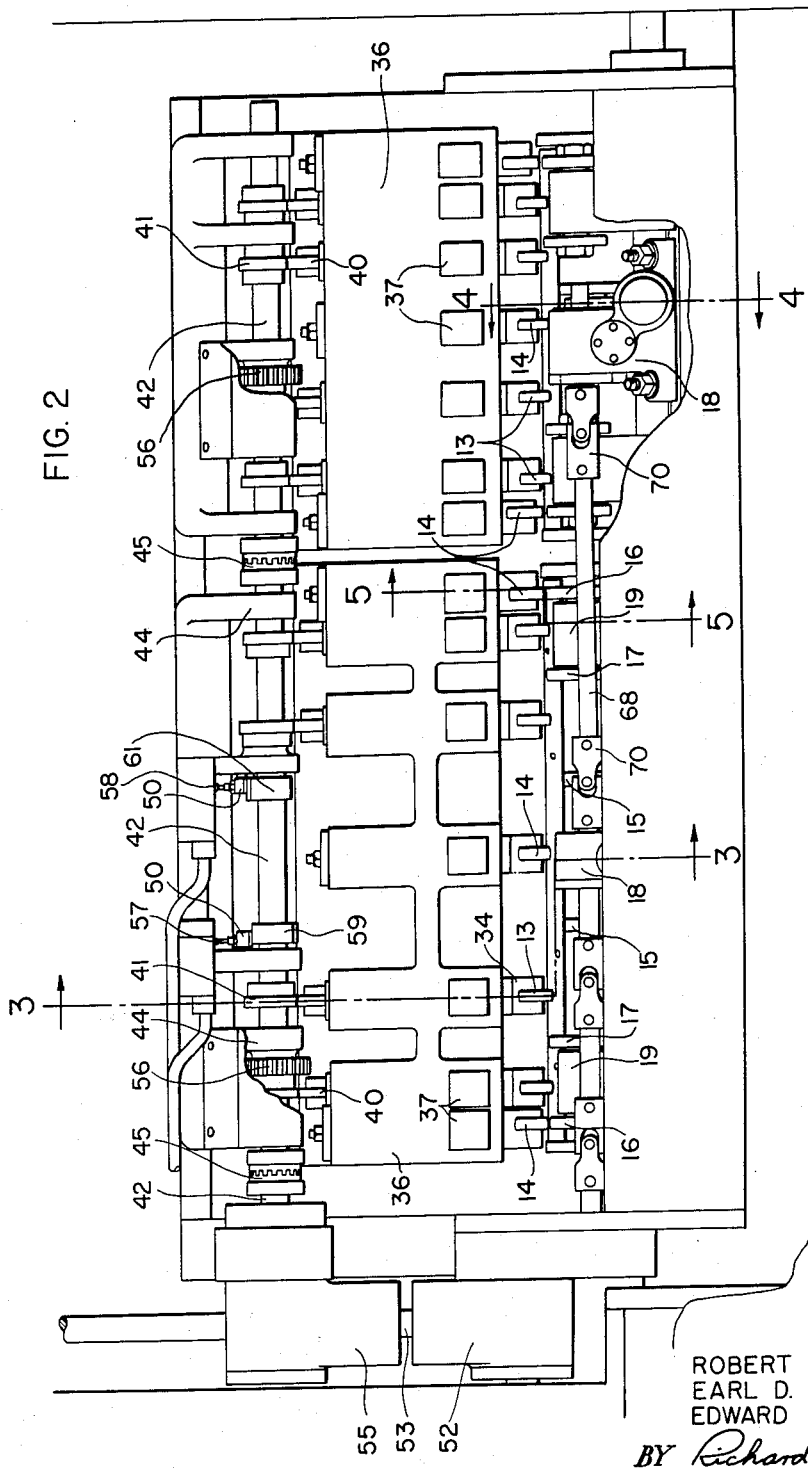
Fig. 2 is a fragmentary front view of the machine.
Figure 3:
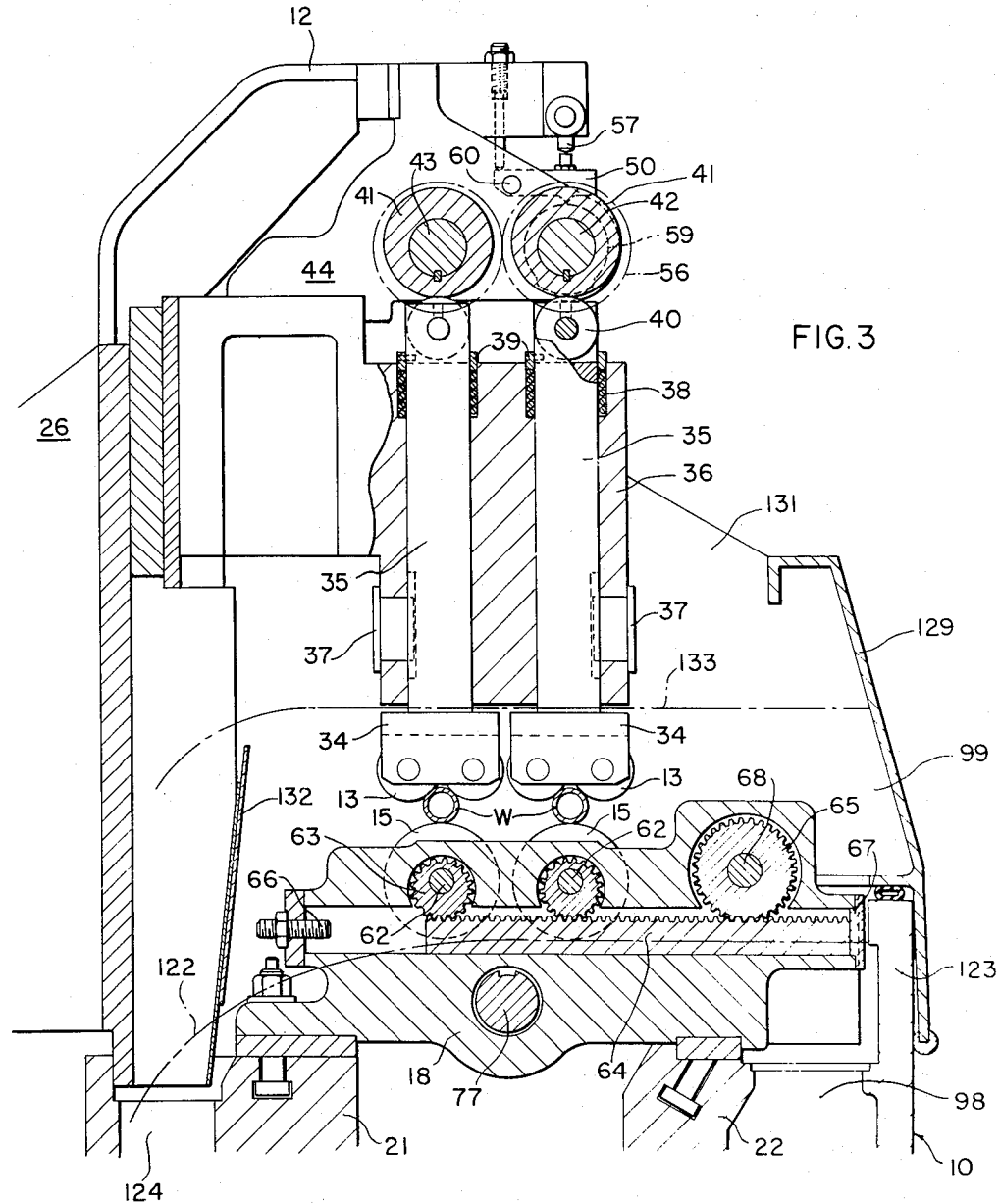
Figure 5:
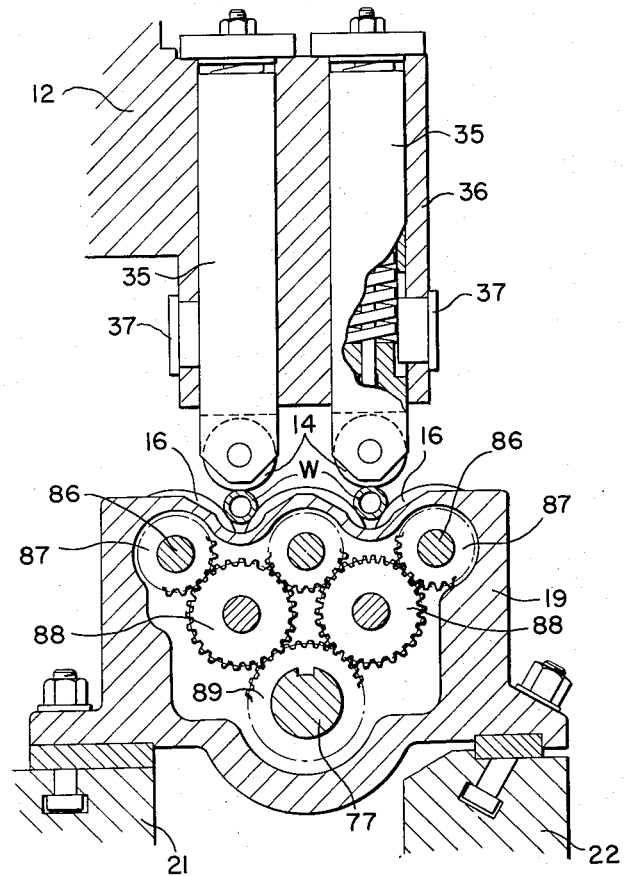
Figure 4:
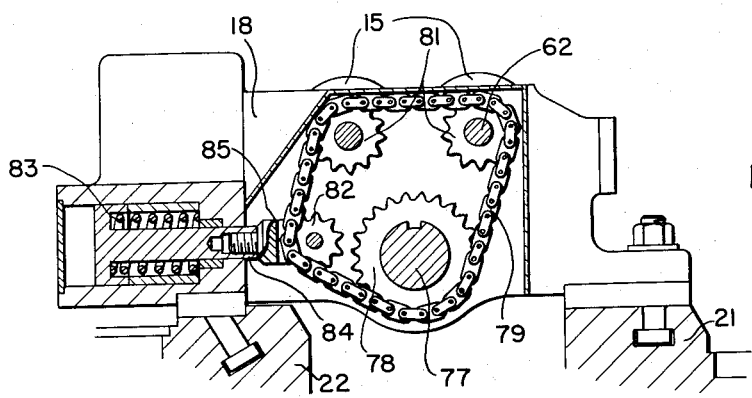

Figs. 3, 4 and 5 are detail vertical sectional views, on a larger scale, taken approximately in the respective planes indicated by section lines 3—3, 4—4 and 5—5 of Fig. 2;

Fig. 6 is a drive diagram of the machine;

Fig. 7 is a diagrammatic view illustrating the effect of shifting the rollers of both sets;

Figs. 8 and 9 are views taken in the planes indicated by lines 8—8 and 9—9 respectively of Fig. 7; and, Fig. 10 is a wiring diagram of the machine.

Figure 1:
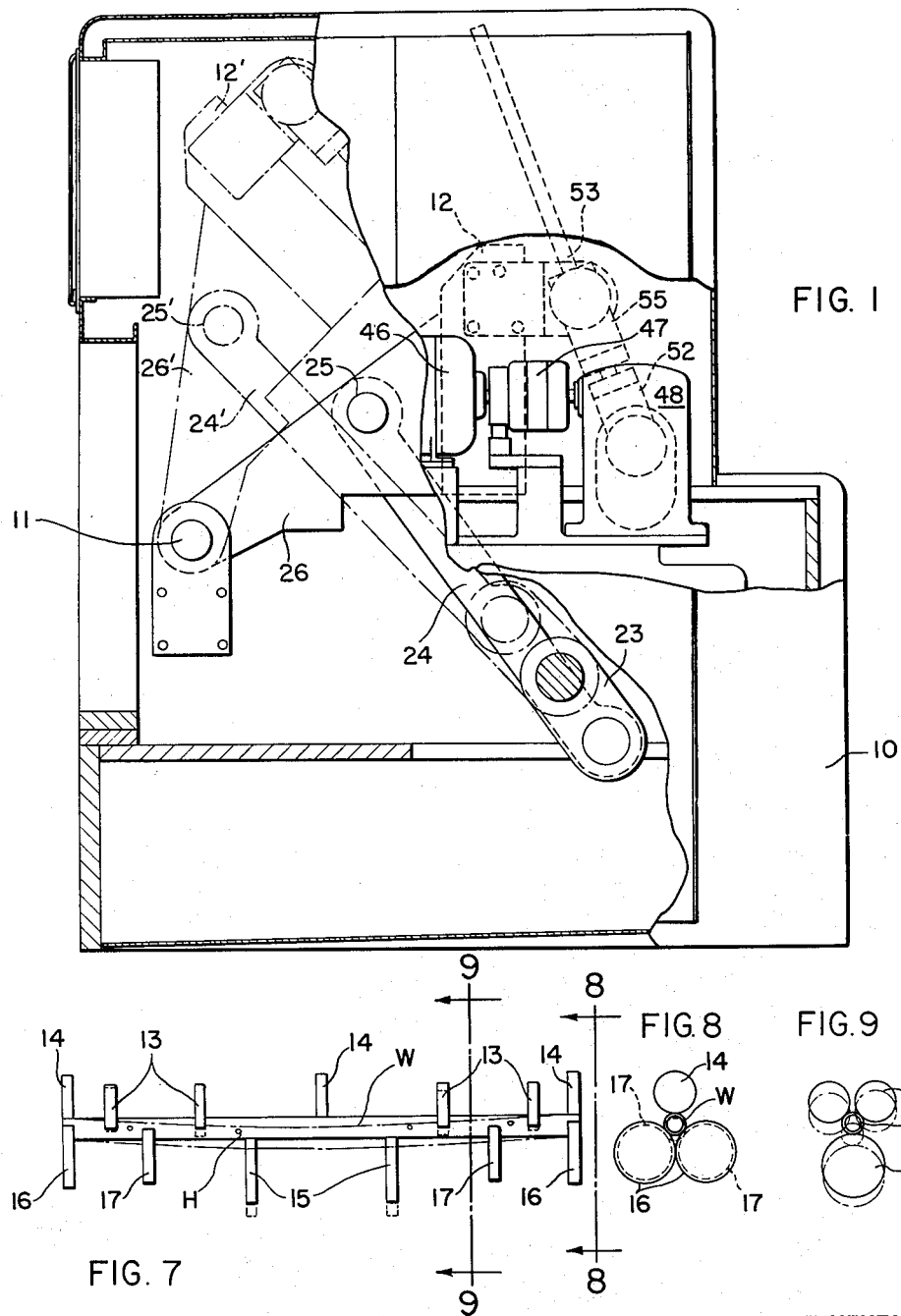
Fig. 1 is a side view of the machine with parts broken away and appearing in section in vertical planes.

The machine has a frame 10 to which there is pivoted at 11 a pressure head 12 carrying an upper set of rollers 13 and 14 (Figs. 2 and 7) which cooperate with a lower set of rollers 15, 16 and 17 to support and confine workpieces W which in the case illustrated may be tubular shafts having oil holes H drilled at various points along them. The invention is applicable to machines of various capacities, but the machine illustrated is adapted to handle four workpieces simultaneously, two in side-by-side and two in end-to-end relationship. The lower rollers 15 are carried by brackets 18 while rollers 16 and 17 are carried by brackets 19. Both brackets 18 and brackets 19 are secured to ways 21 and 22 of the machine frame, being adjustable to various positions along these ways in order to accommodate workpieces of different dimensions. The head 12 is moved between its lowered operative position shown at 12 in dotted lines in Fig. 1, and its raised idle position shown at 12' in broken lines, by means of a pair of cranks 23 (Figs. 1 and 6) whose shafts are rotatable in the frame. Connecting rods 24 pivotally connect the crank pins to pins 25 on the bifurcated arm portions 26 of the head 12. During each quenching and straightening cycle of the machine, the cranks 23 are turned through two half-revolutions by drive means which comprise a motor 27, worm 28, worm wheel 29, shaft 31, pinions 32 and gears 33. One half-revolution lowers the head and the set of rollers 13 and 14 into operative relation with the set of rollers 15, 16 and 17. The other half-revolution returns the head to its raised position. While it is in this position the quenched workpieces may be removed from the lower rollers and other workpieces that are now ready for quenching may be placed on them.

Rollers 13 are journaled in carriers 34 which have shanks 35 slidable in bores in bracket 36 secured to head 12. Keys 37 on the brackets cooperate with keyways in the shanks to hold the latter against rotation. Coiled springs 38 acting between the brackets and collars 39 on shanks 35 urge the latter upwardly to hold shank-carried rollers 40 in contact with cams or eccentrics 41. The latter are carried by shafts 42 and 43 that are journaled for rotation in brackets 44 secured to the head 12 and upon the brackets 36. The shaft 42 is in sections connected by face toothed couplings 45 (Fig. 2). It is driven by means, including a reversing motor 46 (Figs. 1 and 6), a magnetic clutch and brake unit 47, a gear reduction unit 48, shaft 49, bevel gears 51 in housing 52

(Figs. 1 and 2), shaft 53, and bevel gears 54 in a housing 55. The bevel gear 54 on shaft 53 is splined thereto for telescoping motion and the housings 52 and 55 are pivotable about the axes of shafts 49 and 42, respectively. Accordingly, the drive for shaft 42 is effective in any position of pressure head 12 about pivot 11. Shaft 43 is driven from shaft 42 by spur gears 56. The motor 46 is controlled in part by limit switches 57 and 58 that are operated by cams 59 and 61 on shaft 42 through the intermediary of levers 50, these levers being fulcrumed at 60 to two brackets 44 mounted on the head 12 and brackets 36. As shown in Fig. 2 the lobes of these cams 59 and 61 are 180° apart. Cam 59 actuates limit switch 57 to stop motor 46, and also to operate clutch-brake unit 47 to stop shaft 49, when eccentrics 41 reach the position shown in Fig. 3 wherein shanks 35 are elevated. Cam 61 and limit switch 58 operate to stop the motor, and through unit 47 to also stop the shaft 49, when the eccentrics have moved shanks 35 to their lowermost position. As shown in Fig. 7 the inner rollers 13 (the two nearest to the longitudinal center of the workpiece) must move to a lower position than the outer rollers 13 (those nearest the ends of the workpiece) in order to bow the latter to the condition shown in broken lines. Accordingly the cams 41 for the inner and outer rollers 13 have different amounts of eccentricity from the axes of shafts 42 and 43.

The shafts 62 of lower rollers 15 are journaled eccentrically in sleeves 63 which in turn are rotatable in brackets 18. Each sleeve has gear teeth meshing with a rack 64 that is slidable in its bracket 18. A pinion 65 is rotatable to move the rack alternately in opposite directions between a fixed stop 67 and a screw-threaded, adjustable stop 66, the latter being so adjusted that the full stroke of the rack turns the eccentric sleeves one-half revolution, to or from the position shown in Fig. 3 wherein the shafts 62 and rollers 15 are at their maximum elevation. The pinions 65 are mounted on a shaft 68 that is journaled in brackets 18 and is connected by gears 69 (Fig. 6) to shaft 49. Accordingly the eccentric sleeves 63 are turned concomitantly with cams 41, so that the upper rollers 13 and the lower rollers 15 are raised or lowered simultaneously. Universal joints 70 are provided between sections of shaft 68 to accommodate different heights of the brackets 18.

The rollers 15 are rotated by drive means comprising a motor 71 (Fig. 6), drive pulley 72, endless belt 73, driven pulley 74, worm 75, worm wheel 76, shaft 77, sprockets 78 (Figs. 2, 4 and 6) on shaft 77, endless chain 79, and sprockets 81 on the roller shafts 62. As shown in Fig. 4, the chain 79 in addition to engaging the sprockets 78 and 81 also runs around an idler 82 which is constantly urged in a direction to keep the chain taut, i. e. to the left in Fig. 4, by a compressed coil spring 83. The latter acts through a rod 84 and the idler's supporting clevis 85. This arrangement renders the roller drive flexible enough to accommodate the raising and lowering motions of the rollers 15 that have previously been described.

As shown in Figs. 2 and 5 the rollers 16 and 17 are mounted on opposite ends of shafts 86 that are journaled in the brackets 19. Pinions 87 on these shafts are driven through idler pinions 88 by gears 89 that are keyed to the shaft 77. Rollers 17 are slightly smaller in diameter than rollers 16, and hence they contact the work only when the latter is bowed as shown in broken lines in Figs. 7 and 8.

The apparatus for controlling the operation of the machine includes single pole double throw limit switches 91 and 92, and a normally closed limit switch 93, operated respectively by cams 94, 95 and 96 on the shaft of the one crank 23. Cam 96 allows switch 93 to remain closed except when the cranks 23 are in the position wherein the head 12 is fully raised, at which time the cam holds the switch open. Cam 95 normally holds switch 92 with its upper contacts closed, except when the cranks 23 are in the position wherein head 12 is fully lowered. At this time the upper contacts of this switch are open and its bottom contacts closed. The terms "upper" and "lower" as applied to the switch contacts have reference only to their positions in the circuit diagram, Fig. 10, and not to their actual positions in the machine. Cam 94 holds switch 91 with its upper contact closed except in the position of the cranks 23 wherein the head is partially raised to allow drainage of liquid from the quenching chamber of the machine, as will be further explained hereinafter. In this position of the cranks the upper contacts of switch 91 are opened and its lower contacts closed.

Other electrical apparatus includes a motor 97, Fig. 10, for operating a pump (not shown) for elevating quenching liquid from a sump in the machine base through passage 98, Fig. 3, into the quenching chamber 99 of the machine. The motor is operated from a three-wire electric power supply 101, 102, 103, and is controlled by a controller 104. Similarly for the crank drive motor 27 and the roller drive motor 71 there are controllers 105 and 106 respectively. For the reversible deflection drive motor 46 there are forward and reverse controllers 107 and 108. These also control the clutch-brake unit 47 which operates to declutch motor 46 from gear reduction unit 48, and also to brake this unit, simultaneously with deenergization of the motor. For starting and stopping the pump and roller drive motors, and the machine operating cycle, normally open push-button type start switches and normally closed push button type stop switches are provided. These include start and stop switches 111 and 112 for the pump motor 97 and start and stop switches 113 and 114 for roller drive motor 71. For the machine operating cycle a pair of series-connected start switches 115 and a stop switch 116 are provided. There is also a holding relay 117, a drain time relay 118, a quench time relay 119, and a deflection time relay 121. Each of these three time relays is of a type which closes its contacts with a predetermined time delay, that is manually adjustable, after its winding is energized, and retains them closed until a subsequent deenergization of its winding.

When the machine is idle the pressure head 12 is fully raised so that the upper contacts of switches 91 and 92 are closed, and the contacts of switch 93 are open. The deflection rollers are raised and hence switch 57 is open, switch 58 is closed. To start the machine the switches 111 and 113 are first closed momentarily. Circuits are thereby established through the windings of controllers 97 and 71 as follows: from lead 101 through stop switch 112, start switch 111, and the winding of relay 104 to lead 102; and from lead 101 through stop switch 114, start switch 113, and the winding of relay 106 to lead 102. The controller contacts accordingly close starting motors 97 and 71. As soon as the controller contacts close, holding circuits are established to maintain the controller windings energized even though the start switches are now opened. For example, the holding circuit through the winding of controller 104 is from lead 101 through switch 112, the right contact of the controller and the controller winding to lead 102. With the motor 104 in operation quenching liquid in the chamber 99 is raised approximately to the level indicated by broken line 122 in Fig. 3, the liquid being contained by stationary front wall 123 of the chamber but overflowing the way 21 to return to the sump via a passage 124.

Heated workpieces W to be quenched may now be placed on lower rollers 15 and 16, which are being driven by motor 71, and start switches 115 may be closed. As a safety measure these switches are preferably located far enough apart on the front of the machine so that both hands of the operator are required to close them, and their closing energizes the winding of controller 105 to start motor 27, the circuit being from lead 101 through stop switch 116, start switches 115, lead 125, the now closed upper contacts of switches 92 and 91, and the winding of controller 105 to lead 102. The motor 27, energized from leads 101, 102 and 103, drives cranks 23 and thereby lowers pressure head 12 of the machine. As soon as the shaft moves through a small angle the cam 96 allows the switch 93 to close, and this establishes a holding circuit for controller 105 through relay 117 whose winding is energized upon closing of switches 115. The holding circuit is from lead 101 through switch 116, the contacts of relay 117, switch 93, the upper contacts of switches 92 and 91, lead 138 and the winding of controller 105 to lead 102. A branch of the holding circuit is from switch 93 through lead 125, the winding of relay 117 and lead 126 to lead 102. Because of this branch circuit the opening of start switches 115, by the operator releasing pressure on them, now has no effect.

The motor 27 operates continuously until cranks 23 have fully lowered pressure head 12, at which time cam 95 moves switch 92 to open its upper contacts and close its lower contacts. Opening of the upper contacts breaks the circuit to motor controller 105, thereby stopping the motor 27. Closing of the lower contacts energizes the winding of quench time relay 119, the energizing circuit being from lead 101 through stop switch 116, contacts of relay 117, switch 93, the lower contacts of switch 92, a lead 127, the winding of the quench time relay 119 and leads 128 and 126 to lead 102. However, the contacts of relay 119 remain open for the time period for which the relay is set.

With the pressure head 12 lowered, the upper quench chamber rollers 13 and 14 engage the workpieces and press them firmly against the now rotating lower rollers 15 and 16, so that the workpieces are held straight (or, if desired, slightly bowed) and are rotated. A front wall 129, side walls 131 and an adjustable-height rear wall 132 are carried by the lowered pressure head 12, and form a frame which in this lowered position of the head constitutes an upward extension of the quenching chamber walls (including front wall 123 and way 21) which causes the liquid in the quenching chamber to be raised approximately to the level indicated by broken line 133 in Fig. 3. This level is determined by escape of the liquid into passage 124 from beneath and over wall 132, the height of the latter being adjusted so that the workpieces W are completely immersed when the pressure head is lowered.

Quenching continues until the contacts of time relay 119 close. This energizes the forward controller 107 to operate the deflection drive motor 46 in a direction to lower rollers 13 and 15. The clutch-brake unit 47 is energized simultaneously with motor 46, so that the motor is immediately clutched to the reduction unit 48 and braking action is discontinued. The energizing circuit for controller 107 is from lead 101 through lead 134, the upper contact of switch 58, the now closed contacts of relay 119 and the controller winding to lead 102. Operation of motor 46 is discontinued by deenergization of forward controller 107, to thereby stop motor 46, this being caused by cam 61 operating switch 58 to open its upper contacts when rollers 13 and 15 are fully lowered to bow the workpieces W in the manner shown in broken lines in Figs. 7–9. Upon deenergization of the motor 46 the clutch-brake unit immediately stops the deflection drive. The quenched workpieces are now straightened by being rolled between lower rollers 15, 16 and 17 and upper rollers 13 and end rollers 14, the central roller 14 not being effective.

The last-mentioned operation of switch 58 by cam 61 closes the lower contacts of the switch, and thereby energizes the straightening time relay 121, but due to the delayed action of the latter its contacts do not immediately close. The energizing circuit is from lead 101 through lead 134, the lower contacts of switch 58, the winding of relay 121, and leads 128 and 126 to lead 102. Upon expiration of the time for which relay 121 is set its contacts close and reenergize the controller 105, thereby restarting motor 27. The circuit for controller 105 is from lead 101 through stop switch 116, the contacts of holding relay 117, limit switch 93, lead 135, and contacts of relay 121, leads 136 and 137, upper contacts of switches 91, lead 138 and the winding of controller 105 to lead 102.

The motor 27 now turns cranks 23 to raise head 12 enough to permit rapid draining of the quenching fluid from chamber 99 through the opening beneath rear wall 132 into return passage 124. When this position of the head is reached (in practice after the cranks 23 have turned through about 23° from the position in which the head 12 is fully lowered), cam 94 operates switch 91 to open its upper contacts and close its lower contacts. Accordingly the controller 105 is deenergized and motor 27 is stopped. Simultaneously the drain time relay 118 is energized by a circuit from lead 101 through stop switch 116, contacts of relay 117, switch 93, lead 135, contacts of relay 121, leads 136 and 140 to the now closed lower contacts of switch 91, lead 139, winding of relay 118 and lead 126 to lead 102. However for a period of time the contacts of relay 118 remain open. A branch circuit is also established from the lower contacts of switch 91, lead 139, and now closed switch 57, and the winding of reverse controller 108 to lead 102. This energization of controller 108 causes the deflection drive motor 46 to operate to raise rollers 13 and 15 to their initial position (the full line position of Fig. 7). This action is completed by the time the draining of liquid from chamber 99 to a level below workpiece W has been completed. At this time, assuming the drain time relay 118 is properly adjusted, the contacts of this relay will close and again reenergize the controller 105 of motor 27, causing the latter to turn the cranks 23 to fully raise head 12. The energizing circuit for controller 105 is from lead 101, stop switch 116, contacts of relay 117, switch 93, lead 125, now closed upper contacts of switch 92, leads 141, 137 and 136, the now closed contacts of drain time relay 118, lead 138 and the controller winding to lead 102. This circuit is broken, resulting in stopping of motor 27, by cam 96 opening switch 93 when the head 12 is fully raised, this completing the operating cycle of the machine. The opening of switch 93 deenergizes holding relay 117 and hence the motor 27 cannot again operate until start switches 115 are again closed. The quenched and straightened workpieces W may now be removed, and another cycle commenced.

The amount of deflection of rollers 13 and 15 necessary to produce optimum straightening depends upon the shape, size and composition of the workpieces W, and may be determined experimentally. Cams 41 and eccentric sleeves 63 of the proper eccentricity, and rollers 13—17 of the appropriate diameters may then be provided for production runs of like workpieces. While successful practice of the invention therefore does not depend upon the physical principles underlying the method, our theory is that with a perfectly straight workpiece the bowing effected by lowering of rollers 13 and 15 strains the fibers of the workpiece to their elastic liimt, but does not exceed such limit. With a workpiece that is not straight the elastic limit is exceeded in at least one position of rotation of the workpiece, and hence it is permanently deformed to straightened form.

It will be understood that the kind of quenching medium employed, whether water, oil, brine, a caustic soda solution, or the like, and the temperature thereof, will depend upon the nature of the workpieces and the degree and depth to which it is desired to harden them. Satisfactory straightness has been attained in surface-hardening parts of welded tubing of S. A. E. 1015 steel, outside diameter of 0.790 inch, 0.155 inch wall thickness, and approximately twenty-six inch length, by employing a forty-second quench with mineral oil of the viscosity of 100 Saybolt seconds at 100° F., rotating the pieces at approximating 400 R. P. M., with the deflection portion of the cycle extending over the last six seconds of the quenching period, and bowing the workpieces during the deflection on a radius of 150 inches. The workpieces were brought to a temperature of approximately 1500° F. in a carburizing furnace before being placed in the machine in which the quenching oil was held to a temperature between 100° and 140°.

With the machine cycle hereinbefore described and illustrated, there is a single deflection or bowing of the workpiece axis. However in some instances it may be desirable, in order to more completely straighten the work, to effect two or more deflections. That is after quenching for a certain time the axis of the rotating workpiece may be bowed, then returned to its original straightened or less bowed condition, then bowed again, then restraightened, etc. The modification of the machine necessary to carry out this mode of operation, and also other changes and modifications which will readily appear to those skilled in the art, may be made without departing from the principles of our invention or from the scope of the appended claims.

What is claimed is:

1. A rolling quench machine having a quenching chamber and two sets of rollers for supporting a workpiece in the chamber while a quenching medium is there applied to it, means for moving one set of rollers relatively toward and away from the other set respectively to and from an operative relationship wherein rollers of both sets engage the workpiece, and means for rotating the workpiece upon the rollers while they are in such operative relationship, characterized by the provision of a means to simultaneously change the alignment of rollers of both sets while they are in their operative relationship and a workpiece is being rotated between them.

2. A machine according to claim 1 in which the means to change the alignment of both sets of rollers comprises a mechanism to shift at least one roller of each set in a direction generally radial of the workpiece to thereby bow the axis of the latter.

3. A machine according to claim 1 in which the means to change the alignment of the rollers comprises a mechanism for each set to shift at least one roller thereof and means connecting the two mechanisms to cause them to operate simultaneously.

4. A machine according to claim 1, in which there is a frame carrying one of the sets of rollers and a pressure head carrying the other set and pivoted to the frame for motion about a horizontal axis, and in which the means for moving one set of rollers relatively toward and away from the other set comprises a crank journaled in the frame and a rod pivotally connecting the crank and the pressure head.

5. A machine according to claim 2 in which the mechanism includes a rotatable element supporting a roller on an axis eccentric of its own axis, and means to rotate the element through an angle of one-half turn.

6. A machine according to claim 2 in which the means for rotating the workpiece includes a drive for at least one roller that is shifted, said drive being arranged to operate in any position to which the roller is shifted.

7. A machine according to claim 2 in which the mechanism includes a roller support, a rotatable cam for moving the roller support, and means for rotating the cam through a predetermined angle.

8. A machine according to claim 3 in which the operating means for the two mechanisms includes gearing connecting them, said gearing being arranged to maintain such connection during the movement of one set of rollers to and from operative relationship with the other set.

9. A machine according to claim 5 in which the means to rotate the eccentric comprises a pinion connected to the rotatable element, a rack for driving the pinion, means to limit the stroke of the rack so as to rotate the element through only one-half turn, and reversible power means to operate the rack.

10. A machine according to claim 6 in which the roller drive comprises drive and driven sprockets, an endless chain running over said sprockets, and a spring-biased idler also engaging the chain.

11. The method of quenching and straightening a heated workpiece of elongated generally cylindrical form which comprises rotating the workpiece while it is being held substantially straight or slightly bowed between two sets of rollers, applying a quenching medium to the workpiece while it is being so held and rotated, then bowing or further bowing the axis of the workpiece by changing the alignment of rollers of both of the two sets, and rotating the workpiece about such bowed axis.

12. The method of quenching and straightening a heated workpiece of elongated generally cyindrical form which comprises bringing the two sets of rollers into operative relationship to engage the workpiece between them and thereby hold it substantially straight, rotating the workpiece while it is so held, applying a quenching medium to the workpiece for a predetermined period of time while it is so held and rotated, then changing the alignment of rollers of both sets to thereby bow the axis of the workpiece, continuing the rotation of the workpiece while its axis is thus bowed, and then moving one set of rollers out of operative relationship to free the workpiece for removal from the machine.

13. The method of quenching and straightening a heated workpiece of elongated generally cylindrical form which comprises rotating the workpiece while it is being held substantially straight or slightly bowed between two sets of rollers, applying a quenching medium to the workpiece while it is being so held and rotated, then bowing or further bowing the axis of the workpiece by changing the alignment of rollers of both of the two sets, and, while continuing the rotation, restoring the workpiece to said substantially straight or slightly bowed condition by returning the rollers to their initial alignment.

14. The method of quenching and straightening a heated workpiece of elongated generally cylindrical form which comprises bringing the two sets of rollers into operative relationship to engage the workpiece between them and thereby hold it substantially straight, rotating the workpiece while it is so held, applying a quenching medium to the workpiece for a predetermined period of time while it is so held and rotated, then changing the alignment of rollers of both sets to thereby bow the axis of the workpiece, continuing the rotation of the workpiece while its axis is thus bowed, then returning the rollers to their initial alignment to thereby release such bow of the axis of the workpiece, and then moving one set of rollers out of operative relationship to free the workpiece for removal from the machine.

References Cited in the file of this patent

UNITED STATES PATENTS

| | | |
|---|---|---|
| 367,961 | Coffin | Aug. 9, 1887 |
| 976,891 | Machlet | Nov. 29, 1910 |
| 1,448,878 | Smith | Mar. 20, 1923 |
| 2,188,257 | Urschel | Jan. 23, 1940 |
| 2,263,022 | Urschel | Nov. 18, 1941 |
| 2,318,344 | Urschel | May 4, 1943 |